United States Patent [19]
Roesler et al.

[11] Patent Number: 6,077,901
[45] Date of Patent: Jun. 20, 2000

[54] AQUEOUS COMPOSITIONS CONTAINING MIXTURES OF SILANE-FUNCTIONAL RESINS

[75] Inventors: Richard R. Roesler, Wexford; Lyubov K. Gindin, Pittsburgh, both of Pa.

[73] Assignee: Bayer Corporation, Pittsburgh, Pa.

[21] Appl. No.: 09/306,100

[22] Filed: May 6, 1999

[51] Int. Cl.[7] .............................. C08J 3/00; C08K 3/20; C08L 75/00; C08L 83/00; C08G 77/04
[52] U.S. Cl. ................... 524/588; 524/591; 524/837; 524/838; 524/839; 524/840; 528/28
[58] Field of Search ................. 524/588, 591, 524/837, 838, 839, 840; 528/28

[56] References Cited

U.S. PATENT DOCUMENTS

| | | | |
|---|---|---|---|
| 3,479,310 | 11/1969 | Dieterich et al. | 260/29.2 |
| 3,870,684 | 3/1975 | Witt et al. | 260/75 NH |
| 4,066,591 | 1/1978 | Scriven et al. | 260/29.2 TN |
| 4,092,286 | 5/1978 | Noll et al. | 260/29.2 TN |
| 4,108,814 | 8/1978 | Reiff et al. | 260/29.2 TN |
| 4,203,883 | 5/1980 | Hangauer, Jr. | 260/29.2 TN |
| 4,237,264 | 12/1980 | Noll et al. | 528/67 |
| 4,238,378 | 12/1980 | Markusch et al. | 260/29.2 TN |
| 4,408,008 | 10/1983 | Markusch et al. | 524/591 |
| 5,041,494 | 8/1991 | Franke et al. | 524/588 |
| 5,354,808 | 10/1994 | Onwumere et al. | 524/837 |
| 5,554,686 | 9/1996 | Frisch, Jr. et al. | 524/588 |
| 5,859,118 | 1/1999 | Roesler et al. | 524/493 |

*Primary Examiner*—Patrick D. Niland
*Attorney, Agent, or Firm*—Joseph C. Gil; Thomas W. Roy

[57] ABSTRACT

The present invention relates to aqueous compositions containing a mixture of a) 50 to 95% by weight, based on the resin solids content of components a) and b), of an aqueous polyurethane/urea dispersion containing 0.5 to 6% by weight, based on the weight of the polyurethane/ureas, of alkoxysilane groups (calculated as Si, MW 28) and b) 5 to 50% by weight, based on the resin solids content of components a) and b), of a water reducible oligomer which is substantially free from isocyanate groups and has an alkoxysilane group content (calculated as Si, MW 28) of 1 to 6% by weight, based on the weight of the oligomer, and wherein the alkoxysilane groups are incorporated as the reaction product of I) a polyisocyanate component having a minimum average functionality of 2.4 and containing at least 50% by weight of polyisocyanate adducts and II) a compound containing amino and alkoxysilane groups. The present invention also relates to coatings, sealants and adhesives prepared from these aqueous compositions.

19 Claims, No Drawings

AQUEOUS COMPOSITIONS CONTAINING MIXTURES OF SILANE-FUNCTIONAL RESINS

BACKGROUND OF THE INVENTION

1. Field of the Invention

The present invention relates to aqueous compositions containing a mixture of polyurethane/urea resins containing alkoxysilane groups and water reducible oligomers containing alkoxysilane groups, and to coatings, sealants and adhesives prepared from these compositions that have improved solvent resistance.

2. Description of the Prior Art

The production of linear or cross-linked aqueous polyurethane-urea dispersions is known as shown by U.S. Pat. Nos. 3,479,310; 4,066,591; 4,092,286; 4,108,814; 4,237,264; and 4,238,378 which disclose linear polyurethane-ureas and U.S. Pat, Nos. 3,870,684, 4,203,883 and 4,408,008, which disclose cross-linked polyurethane-ureas. The aqueous polyurethane-urea dispersions may be used for a wide range of commercial applications such as adhesives or coatings for various substrates including textile fabrics, plastic, wood, glass fibers and metals. Chemical resistance, abrasion resistance, toughness, tensile strength, elasticity and durability are among the many desirable properties of these coatings.

U.S. Pat. No. 5,859,118 and copending applications, U.S. Ser. Nos. 08/992,163 and 08/992,551, are directed to the production of aqueous polyurethane/urea dispersions containing alkoxysilane groups. While it is disclosed that coatings prepared from these dispersions have improved solvent resistance, it is generally necessary to cure these coatings at elevated temperatures to obtain optimum solvent resistance. Coatings cured at room temperature do not obtain optimum solvent resistance.

Accordingly, it is an object of the present invention to improve the solvent resistance of coatings cured under ambient conditions, while retaining the other valuable properties of coatings prepared from aqueous polyurethane/urea dispersions.

This object may be achieved in accordance with the present invention by blending the aqueous polyurethane/urea dispersions containing alkoxysilane groups with water reducible oligomers containing alkoxysilane groups as described hereinafter.

Aqueous polyurethane dispersions containing alkoxysilane groups are also disclosed in U.S. Pat. Nos. 5,041,494, 5,354,808 and 5,554,686. However, none of the proceeding patents and copending applications disclose that the solvent resistance of coatings obtained from these dispersions could be improved by incorporating water reducible oligomers in accordance with the present invention.

SUMMARY OF THE INVENTION

The present invention relates to aqueous compositions containing a mixture of a) 50 to 95% by weight, based on the resin solids content of components a) and b), of an aqueous polyurethane/urea dispersion containing 0.5 to 6% by weight, based on the weight of the polyurethane/ureas, of alkoxysilane groups (calculated as Si, MW 28) and b) 5 to 50% by weight, based on the resin solids content of components a) and b), of a water reducible oligomer which is substantially free from isocyanate groups and has an alkoxysilane group content (calculated as Si, MW 28) of 1 to 6% by weight, based on the weight of the oligomer, and wherein the alkoxysilane groups are incorporated as the reaction product of I) a polyisocyanate component having a minimum average functionality of 2.4 and containing at least 50% by weight of polyisocyanate adducts and II) a compound containing amino and alkoxysilane groups.

The present invention also relates to coatings, sealants and adhesives prepared from these aqueous compositions.

DETAILED DESCRIPTION OF THE INVENTION

In accordance with the present invention the term "polyurethane/urea" means polymers containing urethane and/or urea groups. The term "water reducible oligomer" means that the oligomer contains sufficient chemically incorporated hydrophilic groups to form a stable dispersion or solution in water.

The aqueous polyurethane/urea dispersions according to the invention may be prepared by either a one-step or a two-step process, preferably by a two-step process, as disclosed in copending application, U.S. Ser. No. 08/992,163 (herein incorporated by reference). In a preferred embodiment of the two-step process an NCO prepolymer is formed in the first step and is subsequently reacted with a compound containing an alkoxysilane group and an aspartate group and optionally a low molecular weight, isocyanate-reactive chain extender in the second step to form the polyurethane/urea either before, during or after being mixed with an aqueous medium. The NCO prepolymer is prepared by reacting an organic polyisocyanate with a high molecular weight polyol, an isocyanate-reactive compound containing hydrophilic groups and optionally a low molecular weight isocyanate-reactive compound, preferably a polyol.

Any of the known starting materials for preparing polyurethane/urea dispersions may be used for preparing the dispersions according to the invention, provided that sufficient alkoxysilane groups are incorporated to obtain the required alkoxysilane group content, preferably by the reaction of isocyanate groups with compounds containing alkoxysilane groups.

Suitable compounds containing alkoxysilane groups include those corresponding to formula I

wherein

X represents identical or different organic groups which are inert to isocyanate groups below 100° C., provided that at least one of these groups is an alkoxy or acyloxy group, preferably alkyl or alkoxy groups having 1 to 4 carbon atoms and more preferably alkoxy groups, Y represents a linear or branched alkylene group containing 1 to 8 carbon atoms, preferably a linear group containing 2 to 4 carbon atoms or a branched group containing 5 to 6 carbon atoms, more preferably a linear group containing 3 carbon atoms and $R_1$ represents hydrogen or an organic group which is inert to isocyanate groups at a temperature of 100° C. or less, preferably hydrogen or an alkyl, cycloalkyl or aromatic group having 1 to 12 carbon atoms and more preferably an alkyl, cycloalkyl or aromatic group having 1 to 8 carbon atoms, or $R_1$ represents a group corresponding to formula II $$—Y—Si—(X)_3 \qquad (II)$$

Especially preferred are compounds in which X represents methoxy, ethoxy groups or propoxy groups, more preferably methoxy or ethoxy groups and most preferably methoxy groups, and Y is a linear group containing 3 carbon atoms.

Examples of suitable aminoalkyl alkoxysilanes of formula I containing secondary amino groups include N-phenylaminopropyl-trimethoxysilane (available as A-9669 from OSI Specialties, Witco), bis-(γ-trimethoxysilylpropyl)amine (available as A-1170 from OSI Specialties, Witco), N-cyclohexylaminopropyltriethoxysilane, N-methylaminopropyl-trimethoxysilane and the corresponding alkyl diethyoxy and dimethoxy silanes.

Examples of suitable aminoalkyl alkoxysilanes of formula I containing primary amino groups include 2-aminoethyl-dimethyl-methoxysilane; 6-aminohexyl-tributoxysilane; 3-aminopropyl-trimethoxy-silane; 3-aminopropyl-triethoxysilane; 3-aminopropyl-methyldiethoxysilane; 5-aminopentyl-trimethoxysilane; 5-aminopentyl-triethoxysilane and 3-aminopropyl-triisopropoxysilane. 3-aminopropyl-trimethoxysilane and 3-aminopropyl-triethoxysilane are particularly preferred.

A special group of compounds containing alkoxysilane groups are those which also contain aspartate groups, such as those corresponding to formula III

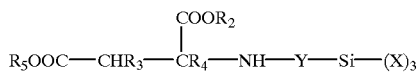

$$(III)$$

wherein X and Y are previously defined, $R_2$ and $R_5$ are identical or different and represent organic groups which are inert to isocyanate groups at a temperature of 100° C. or less, preferably alkyl groups having 1 to 9 carbon atoms, more preferably methyl, ethyl or butyl groups and $R_3$ and $R_4$ are identical or different and represent hydrogen or organic groups which are inert towards isocyanate groups at a temperature of 100° C. or less, preferably hydrogen.

The compounds of formula III are prepared by reacting aminoalkyl alkoxysilanes corresponding to formula IV $$H_2N—Y—Si—(X)_3 \qquad (IV)$$

with maleic or fumaric acid esters corresponding to formula V $$R_5OOC—CR_3=CR_4—COOR_2 \qquad (V)$$

Examples of suitable aminoalkyl alkoxysilanes corresponding to formula IV are the aminoalkyl alkoxysilanes containing primary amino groups previously set forth as corresponding to formula I.

Examples of optionally substituted maleic or fumaric acid esters suitable for use in the preparation of the polyaspartates include dimethyl, diethyl, dibutyl (e.g., di-n-butyl), diamyl, di-2-ethylhexyl esters and mixed esters based on mixture of these and/or other alkyl groups of maleic acid and fumaric acid; and the corresponding maleic and fumaric acid esters substituted by methyl in the 2- and/or 3-position. The dimethyl, diethyl and dibutyl esters of maleic acid are preferred, while the diethyl and dibutyl esters are especially preferred.

The reaction of primary amines with maleic or fumaric acid esters to form the aspartates of formula III is known and described, e.g. in U.S. Pat. No. 5,364,955, which is herein incorporated by reference.

The compounds containing alkoxysilane groups and aspartate groups are present in an amount sufficient to incorporate a minimum amount of 0.5%, preferably 1.0% and more preferably 1.3% by weight, and a maximum amount of 6%, preferably 4% and more preferably 3% by weight, of alkoxysilane groups (calculated as Si, MW 28), wherein the percentages are based on the weight of the polyurethane/ureas.

Suitable polyisocyanates which may be used to prepare the polyurethane/ureas are known and include monomeric organic diisocyanates represented by the formula, $R(NCO)_2$, in which R represents an organic group obtained by removing the isocyanate groups from an organic diisocyanate having a molecular weight of 112 to 1,000, preferably 140 to 400. Preferred diisocyanates are those represented by the above formula in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanato-cyclohexyl)-methane, 1,3- and 1,4-bis-(isocyanatomethyl)-cyclohexane, bis-(4-isocyanatocyclohexyl)-methane, 2,4'-diisocyanato-dicyclohexyl methane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydro-toluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene and mixtures thereof.

Monomeric polyisocyanates containing 3 or more isocyanate groups such as 4-isocyanatomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates may also be used.

Preferred diisocyanates include bis-(4-isocyanatocyclohexyl)-methane, 1,6-hexamethylene diisocyanate, isophorone diisocyanate, α,α,α',α'-tetramethyl-1,3- and/or -1,4-xylylene diisocyanate, 2,4- and/or 2,6-toluylene diisocyanate, and 2,4- and/or 4,4'-diphenylmethane diisocyanate. Especially preferred are bis-(4-isocyanatocyclohexyl)-methane and isophorone diisocyanate.

Organic compounds containing at least two isocyanate-reactive groups, which may be reacted with the previously described organic diisocyanates to prepare the NCO prepolymers, can be divided into two groups, i.e., high molecular weight compounds having molecular weights from 400 to about 6,000, preferably from 800 to about 3,000, and low molecular weight compounds (chain extenders) having molecular weights below 400. The molecular weights are number average molecular weights ($M_n$) and are determined by end group analysis (OH number). Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred.

Further details concerning the low molecular weight compounds and the starting materials and methods for preparing the high molecular weight polyhydroxy compounds are disclosed in U.S. Pat. No. 4,701,480, herein incorporated by reference. The high molecular weight polyols are used in an amount of at least 5%, preferably at least 10% by weight, based on the weight of the polyurethane/urea. The maximum amount of these polyols is 85%, preferably 75% by weight, based on the weight of the polyurethane/urea.

The low molecular weight isocyanate-reactive compounds having an average molecular weight of up to 400 are selected from the known polyhydric alcohols, preferably dihydric alcohols, and the known low molecular weight polyamines, preferably diamines. Examples of polyhydric alcohols are those described for the preparation of the polyester and polyether polyols in the references incorporated by reference. Preferred polyhydric alcohols, preferably dihydric alcohols include ethylene glycol, propylene glycol-(1,2) and -(1,3), butylene glycol-(1,4) and -(1,3), hexanediol-(1,6), octanediol-(1,8), neopentyl glycol, glycerine and trimethlyolpropane.

Examples of suitable polyamines include those disclosed in U.S. Pat. No. 4,408,008, herein incorporated by reference. Also suitable are the aldimines disclosed in U.S. Pat. No. 5,569,706 and the aspartates disclosed in U.S. Pat. No. 5,126,170, both of which are herein incorporated by reference. Preferred polyamines include 1-amino-3-aminomethyl-3,5,5-trimethyl-cyclohexane (isophorone diamine or IPDA), bis-(4-amino-cyclohexyl)-methane, bis-(4-amino-3-methylcyclohexyl)-methane, 1,6-diaminohexane, hydrazine, ethylene diamine, diethylene triamine, triethylene tetramine, tetraethylene pentamine and pentaethylene hexamine.

In addition to the above-mentioned components which are preferably difunctional in the isocyanate polyaddition reaction, mono-functional and even small portions of tri-functional and higher functional components generally known in polyurethane chemistry, such as trimethylolpropane, may be used in special cases in which slight branching of the NCO prepolymer or polyurethane/urea is desired.

In order to enable the polyurethane/urea to be stably dispersed in an aqueous medium, ionic or potential ionic groups and/or lateral or terminal, hydrophilic ethylene oxide units are chemically incorporated into the polyurethane/urea. The ionic or potential ionic groups may be either anionic or cationic, preferably anionic. Examples of anionic groups include carboxylate and sulfonate groups, while examples of cationic groups include ammonium and sulfonium groups.

The ionic groups are incorporated in an amount sufficient to provide an ionic group content of 0 to 200 milliequivalents per 100 g of polyurethane/urea. When the ionic or potential ionic groups are incorporated, they are preferably incorporated in an amount sufficient to provide an ionic group content of at least 10, preferably at least 20 milliequivalents per 100 g of polyurethane/urea. The upper limit for the content of ionic groups is preferably 180, more preferably 100 milliequivalents per 100 g of polyurethane/urea.

The content of hydrophilic ethylene oxide units may be up to about 10%, preferably up to about 8%, more preferably about 1 to 6% and most preferably about 2 to 6%, by weight, based on the weight of the polyurethane/urea. In addition, up to about 75% of the allowable, chemically incorporated, hydrophilic ethylene oxide units may be replaced by the known nonionic, external emulsifiers.

The ionic groups are formed by neutralizing the corresponding potential ionic groups either prior to, during or after formation of the polyurethane/urea. When the potential ionic groups are neutralized prior to their incorporation into the polyurethane/urea, the ionic groups are incorporated directly. When neutralization is performed subsequent to forming the polyurethane/urea, potential ionic groups are incorporated.

Suitable compounds for incorporating the carboxylate, sulfonate and quaternary nitrogen groups are described in U.S. Pat. Nos. 3,479,310, 4,108,814 and 4,303,774, the disclosures of which are herein incorporated by reference. Suitable compounds for incorporating tertiary sulfonium groups are described in U.S. Pat. No. 3,419,533, also incorporated by reference. The preferred sulfonate groups for incorporation into the NCO prepolymer are the diol sulfonic acids or the diol sulfonates disclosed in U.S. Pat. No. 4,108,814.

The neutralizing agents for converting the potential ionic groups to ionic groups are described in the preceding U.S. patents and are also discussed hereinafter. Within the context of this invention, the term "neutralizing agents" is meant to embrace all types of agents which are useful for converting potential ionic groups to ionic groups.

The preferred carboxylate groups for incorporation into polyurethane/urea are the dihydroxy alkanoic acids described in U.S. Pat. No. 3,412,054, herein incorporated by reference, especially α,α-dimethylol propionic acid.

Suitable compounds for incorporating the lateral or terminal, hydrophilic ethylene oxide units are known and include the compounds disclosed in U.S. Pat. Nos. 3,905,929, 3,920,598 and 4,190,566 (the disclosures of which are herein incorporated by reference). Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, for example propylene oxide.

Processes for the preparation of the polyurethane/ureas containing alkoxysilane groups are set forth in copending application Ser. No. 08/992,163, which has previously been incorporated by reference.

Suitable neutralizing or quaternizing agents for converting the potential anionic groups to anionic groups either before, during or after their incorporation into the polyurethane/ureas, are tertiary amines, alkali metal cations or ammonia. Examples of these neutralizing agents are disclosed in U.S. Pat. Nos. 4,501,852 and 4,701,480, which are incorporated by reference. Preferred neutralizing agents are the trialkyl-substituted tertiary amines and include triethyl amine, N,N-dimethyl-ethanol amine, triethanol amine and N-methyl-diethanol amine. Suitable neutralizing agents for converting potential cationic groups to cationic groups are disclosed in U.S. Pat. Nos. 3,479,310 and 3,419,533, which are incorporated by reference.

A sufficient amount of the potential ionic groups must be neutralized so that when combined with the hydrophilic ethylene oxide units and optional external emulsifiers, the polyurethane/urea final product will be a stable dispersion. Generally, at least about 75%, preferably at least about 90%, of the potential ionic groups are neutralized to the corresponding ionic groups. The conversion of the potential ionic groups to ionic groups is conducted in known manner, e.g., as described in the preceding patents setting forth suitable neutralizing agents.

A preferred method of preparing the aqueous polyurethane/ureas is to prepare an NCO prepolymers, react a portion of the isocyanate groups with a compound containing amino and alkoxysilane groups, disperse the prepolymer in water and then react at least a portion of the remaining isocyanate groups of the prepolymer with the amino group-containing chain extenders, which may be mixed with water either before, during or after dispersing the NCO prepolymer. The NCO prepolymers are preferably reacted with the compounds containing amino and alkoxysilane groups before the prepolymers are dispersed in water since these latter compounds are not compatible with water.

The amino group-containing compounds are preferably a mixture containing
  i) 5 to 100 mole percent, based on the moles of amino group-containing compounds, of one or more compounds containing an alkoxysilane group and an aspartate group and
  ii) 0 to 90 mole percent, based on the moles of amino group-containing compounds, of amino group-containing compounds other than a).

In a preferred embodiment of the two-step process for preparing the aqueous polyurethane/urea dispersions of the present invention, the NCO prepolymers are reacted with components i) and ii).

Examples of polyamines for use as component b) include those disclosed in U.S. Pat. No. 4,408,008, herein incorporated by reference. Especially preferred are 1-amino-3-aminomethyl-3,5,5-trimethyl-cyclohexane (isophorone diamine or IPDA), bis-(4-amino-cyclohexyl)-methane, bis-(4-amino-3-methylcyclohexyl)-methane, 1,6-diaminohexane, hydrazine, ethylene diamine, diethylene triamine, triethylene tetramine, tetraethylene pentamine and pentaethylene hexamine.

The amount of amino group-containing compounds to be used in accordance with the present invention is dependent upon the number of isocyanate groups in the prepolymer. Preferably, the ratio of isocyanate groups to amino groups is 1.0:0.6 to 1.0:1.1, preferably 1.0:0.8 to 1.0:0.98 on an equivalent basis.

The final dispersion is a stable, aqueous dispersion of polyurethane/urea particles having a solids content of up to 60% by weight, preferably 15 to 60% by weight and more preferably 30 to 45% by weight. However, it is always possible to dilute the dispersions to any minimum solids content desired.

In accordance with the present invention the polyurethane/urea dispersions containing alkoxysilane groups are blended with water reducible oligomers which are substantially free from isocyanate groups, have an alkoxysilane group content (calculated as Si, MW 28) of 1 to 6% by weight, based on the weight of the oligomers, and contain sufficient chemically incorporated hydrophilic groups to form a stable dispersion or solution in water. These oligomers are disclosed in copending application, U.S. Ser. No. 09/057,675 (herein incorporated by reference).

The alkoxysilane groups are incorporated into the oligomers as the reaction product of a polyisocyanate component having a minimum average functionality of 2.4 and containing at least 50% by weight of polyisocyanate adducts, an amino compound corresponding to formula I and a compound containing hydrophilic groups. The amino compounds containing alkoxysilane groups and the compounds containing hydrophilic groups are the same as those previously described for use in preparing the polyurethane/urea dispersions containing alkoxysilane groups with the exception that in formula I, $R_1$ may not represent hydrogen.

Preferably, the oligomers are substantially free from isocyanate groups, i.e., they contain less than 1.0% by weight, preferably less 0.5% by weight and more preferably less than 0.1% by weight of isocyanate groups, based on the weight of the compounds. The oligomers contain 1 to 6% by weight, preferably 2 to 6% by weight and more preferably 2 to 5% by weight, of alkoxysilane groups (calculated as Si, MW 28), based on the weight of the oligomers.

The polyisocyanate component for preparing the oligomers containing alkoxysilane groups has a minimum average functionality of 2.4, preferably to 2.6 and more preferably 2.8, and a maximum average functionality of 6, more preferably 5. The polyisocyanate component may contain monomeric diisocyanates or polyisocyanate adducts having a functionalities which do not satisfy these requirements, provided that the average functionality of the polyisocyanate component satisfies these requirements. Oligomers b) are not prepared from NCO prepolymers, which means that the high molecular compounds used to prepare the NCO prepolymers are not used to prepare oligomers b).

The polyisocyanate component contains at least 50% by weight, preferably at least 70% by weight, more preferably at least 95% by weight of polyisocyanates adducts containing isocyanurate, uretdione, biuret, urethane, allophanate, iminooxadiazine dione, carbodiimide and/or oxadiazinetrione groups, preferably isocyanurate, uretdione, biuret, iminooxadiazine dione and/or allophanate groups. In addition to the polyisocyanate adducts the polyisocyanate component may optionally contain either monomeric polyisocyanates or other polyisocyanate adducts.

Suitable monomeric diisocyanates, which may be present in the polyisocyanate component in the form of monomers or which may be used to prepare the polyisocyanate adducts are the same as those previously used to prepare component a). The preferred organic diisocyanates are also the same as those for preparing component a).

Suitable polyisocyanate adducts, which preferably have an NCO content of 5 to 30% by weight, include:

1) Isocyanurate group-containing polyisocyanates which may be prepared as set forth in DE-PS 2,616,416, EP-OS 3,765, EP-OS 10,589, EP-OS 47,452, U.S. Pat. No. 4,288, 586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a suitable catalyst, e.g., a trialkyl phosphine catalyst, and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906, 126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018, the disclosures of which are herein incorporated by reference, preferably polyisocyanates containing these groups in a ratio of monoisocyanurate groups to mono-allophanate groups of about 10:1 to 1:10, preferably about 5:1 to 1:7.

7) Iminooxadiazine dione and optionally isocyanurate group-containing polyisocyanates which may be prepared in the presence of special fluorine-containing catalysts as described in DE-A 19611849. These polyisocyanates generally have an average NCO functionality of 3 to 3.5 and an NCO content of 5 to 30%, preferably 10 to 25% and most preferably 15 to 25% by weight.

8) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

9) Polyisocyanates containing oxadiazinetrione groups and containing the reaction product of two moles of a diisocyanate and one mole of carbon dioxide.

Preferred polyisocyanate adducts are the polyisocyanates containing isocyanurate, uretdione, biuret, iminooxadiazine dione and/or allophanate groups.

Suitable hydrophilic compounds which can be incorporated into the oligomers containing alkoxysilane groups to enable them to be stably dispersed or dissolved in an aqueous medium are the same as those previously disclosed for preparing the polyurethane/urea dispersions containing alkoxysilane groups, preferably compounds containing lateral or terminal, hydrophilic ethylene oxide units.

When only hydrophilic ethylene oxide units are used to provide hydrophilicity, they are generally incorporated in an amount of 5 to 35%, preferably 10 to 30% and more preferably about 12 to 25% by weight, based on the weight of the compounds containing alkoxysilane groups.

When only ionic groups are used to provide hydrophilicity, they are incorporated in an amount sufficient to provide an ionic group content of 10 to 200 milliequivalents, preferably 10 to 100 milliequivalents and more preferably 25 to 50 milliequivalents, per 100 g of the compounds containing alkoxysilane groups.

The compounds containing alkoxysilane groups according to the invention are prepared by reacting the polyisocyanate component with the amino-functional silanes and the hydrophilic compounds at a ratio of isocyanate groups to isocyanate-reactive groups of approximately 1:1, such that the resulting product is substantially free of isocyanate groups.

Prior to mixing with component a), oligomers b) may be present either as oil-in-water or water-in-oil emulsions, which preferably have a solids content of 20 to 80% by weight, more preferably 30 to 70% by weight and most preferably 35 to 50% by weight, based on the weight of the one-component composition. Oligomers b) may also be mixed with the polyurethane/ureas of component a) prior to either resin being mixed with water.

To obtain the aqueous compositions of the present invention water reducible oligomers b) are blended with polyurethane/urea dispersions a) in amounts such that the resulting compositions contain, based on resin solids, 50 to 95% by weight, preferably 60 to 90% by weight and more preferably 60 to 85% by weight of component a), and 5 to 50% by weight, preferably 10 to 40% by weight and more preferably 15 to 40% by weight of component b).

The compounds of the present invention are suitable for use in aqueous, one-component, coating, sealing or adhesive compositions, which can be cross-linked by "silane polycondensation," i.e., the hydrolysis and condensation of silane groups (Si—OR) to form siloxane groups (Si—O—Si). When used for this purpose, these compounds may be used as mixtures with suitable acidic or basic catalysts. Examples include acids such as paratoluene sulfonic acid; metallic salts such as dibutyl tin dilaurate; tertiary amines such as triethylamine or triethylene diamine; and mixtures of these catalysts. Low molecular weight, basic aminoalkyl trialkoxysilanes, such as those represented by formula IV, also accelerate hardening of the compounds according to the invention.

The compositions may also contain other compounds containing alkoxysilane groups as co-reactants for the compounds containing alkoxysilane groups, e.g., to provide a composition with increased inorganic character. Examples of these co-reactants include tetramethoxy silane, tetraethoxy silane, methyl triethoxy silane, methyl trimethoxy silane, ethyl triethoxy silane, octyl triethoxy silane and dimethyl diethoxy silane.

The dispersions may be blended with other dispersions or with other known additives such as fillers, colloidal silica, plasticizers, pigments, carbon black, silica sols and the known leveling agents, wetting agents, antifoaming agents and stabilizers.

The aqueous compositions are suitable for coating and impregnating woven and nonwoven textiles, leather, paper, wood, metals, ceramics, stone, concrete, bitumen, hard fibers, straw, glass, porcelain, plastics of a variety of different types, glass fibers for antistatic and crease-resistant finishing; as binders for nonwovens, adhesives, adhesion promoters, laminating agents, hydrophobizing agents, plasticizers; as binders, for example, for cork powder or sawdust, glass fibers, asbestos, paper-like materials, plastics or rubber waste, ceramic materials; as auxiliaries in textile printing and in the paper industry; as additives to polymers as sizing agents, for example, for glass fibers; and for finishing leather.

Drying of the products obtained by various application techniques may be carried out either at room temperature or at elevated temperature, preferably under ambient conditions. When the products are cured, water evaporates and the silane groups react with one another to form Si—O—Si linkages, which provide additional crosslinking.

In the following examples all parts and percentages are by weight unless otherwise specified.

EXAMPLES

The following ingredients were used in the examples:

Polyol 1

A polyester diol prepared from 1,6-hexanediol, neopentyl glycol and adipic acid (molar ratio of glycols 65:35) and having a number average molecular weight of 1700.

Polyol 2

A polyester diol prepared from 1,6-hexanediol and adipic acid and having a number average molecular weight of 840.

Polyether Monoalcohol 1

A polyethylene oxide monoalcohol prepared by the ethoxylation of methanol and having a molecular weight of 550 (available from Union Carbide as Carbowax 550).

Polyisocyanate 1

An isocyanurate group-containing polyisocyanate prepared from 1,6-hexamethylene diisocyanate and having an isocyanate content of 21.6%, a monomeric diisocyanate content of <0.2% and a viscosity at 20° C. of 3000 mPa.s (available from Bayer Corporation as Desmodur N 3300).

Silane Aspartate 1

1482 parts (8.27 equiv.) of 3-aminopropyltrimethoxysilane were added to a 5 liter flask fitted with agitator, thermocouple, nitrogen inlet and addition funnel with condenser. 1423.2 parts (8.27 equiv.) of diethyl maleate were added dropwise through the addition funnel over a period of 2 hours. The temperature of the reactor was maintained at 25° C. during the addition. The reactor was maintained at 25° C. for an additional 5 hours at which time the product was poured into glass containers and sealed under a blanket of nitrogen. After one week the unsaturation number was 0.6 indicating the reaction was ~99% complete. The product, N-(3-trimethoxysilylpropyl) aspartic acid diethyl ester, had a viscosity of 11 mPa.s at 25° C.

Example 1

Polyurethane/urea Dispersion 1 Containing Alkoxysilane Groups

To a three neck flanged resin flask fitted with stirrer, nitrogen inlet, thermocouple and condenser were added 176.4 parts (0.42 equiv.) of polyol 2, 17.19 parts (0.33 e.q.) of neopentyl glycol, 33.50 parts (0.50 equiv.) of dimethylol propionic acid and 91.95 parts of N-methyl pyrolidinone (NMP). The temperature of the reaction mixture was raised to 90° C. to melt and homogenize the mixture. The reaction mixture was cooled to 80° C. and 166.66 parts (1.50 equiv.) of IPDI were added in one portion. 1.97 parts of dibutyltin dilaurate were added to the mixture. The reaction was held at 90° C. for two hours at which time the theoretical NCO of 2.65% was obtained. 66.00 (0.18 equiv.) of silane aspartate 1 were then added. The reaction mixture was held at 80° C. for 30 min. 20.24 parts (0.2 equiv.; 80% of the acid) of triethyl amine were added to neutralize the acid. The neutralized mixture was stirred at 70° C. for 15 minutes. 555 parts of room temperature water were added to 574 parts of the prepolymer under high shear. The high shear was maintained for 1 hour to yield a dispersion that was stable for 4 weeks. The dispersion had a resin solids content of 40% and contained 8.1% NMP.

Example 2

Polyurethane/urea Dispersion 2 Containing Alkoxysilane Groups

To a three neck flanged resin flask fitted with stirrer, nitrogen inlet, thermocouple and condenser were added 314.5 parts (0.37 equiv.) of polyol 1, 20.83 parts (0.40 e.q.) of neopentyl glycol, 33.50 parts (0.50 equiv.) of dimethylol propionic acid and 90.92 parts of N-methyl pyrolidinone (NMP). The temperature of the reaction mixture was raised to 90° C. to melt and homogenize the mixture. The reaction mixture was cooled to 80° C. and 166.66 parts (1.50 equiv.) of IPDI were added in one portion. 0.58 parts of dibutyltin dilaurate were added to the mixture. The reaction was held at 90° C. for two hours at which time the theoretical NCO of 1.80% was obtained. 66.00 (0.18 equiv.) of silane aspartate 1 were then added. The reaction mixture was held at 80° C. for 30 min. 20.24 parts (0.2 equiv.; 80% of the acid) of triethyl amine were added to neutralize the acid. The neutralized mixture was stirred at 70° C. for 15 minutes. 771 parts of room temperature water were added to 712 parts of the prepolymer under high shear. The high shear was maintained for 1 hour to yield a dispersion that was stable for 4 weeks. The dispersion had a resin solids content of 40% and contained 6.1% NMP.

Example 3

Water Reducible Resin 1 Containing Alkoxysilane Groups 195 parts (1 equiv.) of polyisocyanate 1 were added at ambient temperature to a reaction flask equipped with an agitator, nitrogen inlet, thermocouple and addition funnel with condenser. The reaction flask was heated to 60° C. 82.5 parts (0.15 equiv.) of polyether monoalcohol 1, heated to 60° C., was added to the reaction flask through the addition funnel over a twenty minute period in order to control the exotherm for the formation of the urethane. The reaction was maintained at 60° C. for 4 hours, at which time the isocyanate content was 14.4% (theoretical NCO 14.1%).

The reaction was cooled to 40° C. and 312 parts (0.85 equiv.) of silane aspartate 1 were added through an addition funnel to control the exotherm. The reaction was heated for an additional 3 hours until no isocyanate groups remained as determined by IR spectroscopy. After cooling to room temperature, the resulting product had a viscosity of 53,500 mPa.s at 25° C.

Preparation and Testing of Coatings 90 parts of the polyurethane/urea dispersions were combined with 10 parts of water reducible resin 1 and 10 parts of water under high agitation. The resulting dispersions were coated onto steel panels in an amount sufficient to provide a dry film thickness of ~3.5 mil. The coatings were dried under ambient conditions for up to six weeks. After cooling the films were subjected to an MEK double rub test. This test used a two pound ball peen hammer, which had cheese cloth wrapped around the round end. The test was conducted by wetting the cloth with MEK and then rubbing the panel. One double rub consisted of one back and forth movement of the panel.

The results are set forth in the following table.

| Results of MEK Double Rub Test - Ambient Temperature Cure | | | | |
|---|---|---|---|---|
| Film Age, Weeks | Polyurethane/ urea dispersion | Water reducible resin | Fail point - number of double rubs | Film condition |
| 1 | 1 | None | 32 | Downgloss |
| 2 | 1 | None | 25 | Downgloss |
| 6 | 1 | None | 30 | Downgloss |

-continued

Results of MEK Double Rub Test - Ambient Temperature Cure

| Film Age, Weeks | Polyurethane/ urea dispersion | Water reducible resin | Fail point - number of double rubs | Film condition |
|---|---|---|---|---|
| 1 | 2 | None | 30 | Downgloss |
| 2 | 2 | None | 40 | Downgloss |
| 6 | 2 | None | 40 | Downgloss |
| 1 | None | 1 | 0 | Downgloss |
| 2 | None | 1 | 0 | Downgloss |
| 6 | None | 1 | 0 | Downgloss |
| 1 | 1 | 1 | 70 | Downgloss |
| 2 | 1 | 1 | 70 | Downgloss |
| 6 | 1 | 1 | 100 | Downgloss |
| 1 | 1 | 1 | 75 | Downgloss |
| 2 | 2 | 1 | 100 | Downgloss |
| 6 | 2 | 1 | 100 | No effect |

It is clear from the results set forth in the table that when cured under ambient conditions the solvent resistance of the polyurethane/urea dispersion and the water reducible resin is not as good as the solvent resistance of a mixture of these two resins. It is surprising that the solvent resistance of the polyurethane/urea dispersion could be improved by the addition of the water reducible resin since this latter resin by itself has virtually no solvent resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous composition containing a mixture of
   a) 50 to 95% by weight, based on the resin solids content of components a) and b), of an aqueous polyurethane/ urea dispersion containing 0.5 to 6% by weight, based on the weight of the polyurethane/ureas, of alkoxysilane groups (calculated as Si, MW 28) and
   b) 5 to 50% by weight, based on the resin solids content of components a) and b), of a water reducible oligomer which is substantially free from isocyanate groups and has an alkoxysilane group content (calculated as Si, MW 28) of 1 to 6% by weight, based on the weight of the oligomer, and wherein the alkoxysilane groups are incorporated as the reaction product of
   I) a polyisocyanate component having a minimum average functionality of 2.4 and containing at least 50% by weight of polyisocyanate adducts and
   II) a compound containing amino and alkoxysilane groups.

2. The aqueous composition of claim 1 wherein the alkoxysilane groups are incorporated into at least one of components a) and b) by the reaction of isocyanate groups with an amino compound corresponding to formula III

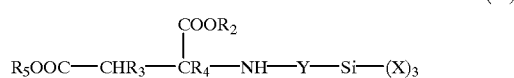

(III)

wherein
X represents identical or different organic groups which are inert to isocyanate groups below 100° C., provided that at least one of these groups is an alkoxy or acyloxy group, Y represents a linear or branched alkylene group containing 1 to 8 carbon atoms, $R_2$ and $R_5$ are identical or different and represent organic groups which are inert to isocyanate groups at a temperature of 100° C. or less, and $R_3$ and $R_4$ are identical or different and represent hydrogen or organic groups which are inert to isocyanate groups at a temperature of 100° C. or less.

3. The aqueous composition of claim 2 wherein
X represents identical or different alkyl or alkoxy groups having 1 to 4 carbon atoms,
Y represents a linear group containing 2 to 4 carbon atoms or a branched group containing 5 to 6 carbon atoms,
$R_2$ and $R_5$ are identical or different and represent methyl, ethyl or butyl and $R_3$ and $R_4$ represent hydrogen.

4. The aqueous composition of claim 1 wherein said polyurethane/ureas contain 10 to 120 milliequivalents, per 100 grams of polyurethane/ureas, of chemically incorporated anionic groups and up to about 10% by weight, based on the weight of said polyurethane/ureas, of lateral and/or terminal hydrophilic chains containing ethylene oxide units.

5. The aqueous composition of claim 2 wherein said polyurethane/ureas contain 10 to 120 milliequivalents, per 100 grams of polyurethane/ureas, of chemically incorporated anionic groups and up to about 10% by weight, based on the weight of said polyurethane/ureas, of lateral and/or terminal hydrophilic chains containing ethylene oxide units.

6. The aqueous composition of claim 3 wherein said polyurethane/ureas contain 10 to 120 milliequivalents, per 100 grams of polyurethane/ureas, of chemically incorporated anionic groups and up to about 10% by weight, based on the weight of said polyurethane/ureas, of lateral and/or terminal hydrophilic chains containing ethylene oxide units.

7. The aqueous composition of claim 4 wherein at least about 80% of said anionic groups are carboxylate groups neutralized with tertiary amines.

8. The aqueous composition of claim 5 wherein at least about 80% of said anionic groups are carboxylate groups neutralized with tertiary amines.

9. The aqueous coating composition of claim 6 wherein at least about 80% of said anionic groups are carboxylate groups neutralized with tertiary amines.

10. The aqueous composition of claim 1 wherein the polyisocyanate component has a minimum average functionality of at least 2.8 and contains at least 70% by weight of a polyisocyanate adduct containing isocyanurate, uretdione, biuret, iminooxadiazine dione and/or allophanate groups.

11. The aqueous composition of claim 2 wherein the polyisocyanate component has a minimum average functionality of at least 2.8 and contains at least 70% by weight of a polyisocyanate adduct containing isocyanurate, uretdione, biuret, iminooxadiazine dione and/or allophanate groups.

12. The aqueous composition of claim 3 wherein the polyisocyanate component has a minimum average functionality of at least 2.8 and contains at least 70% by weight of a polyisocyanate adduct containing isocyanurate, uretdione, biuret, iminooxadiazine dione and/or allophanate groups.

13. The aqueous composition of claim 4 wherein the polyisocyanate component has a minimum average functionality of at least 2.8 and contains at least 70% by weight of a polyisocyanate adduct containing isocyanurate, uretdione, biuret, iminooxadiazine dione and/or allophanate groups.

14. The aqueous composition of claim 5 wherein the polyisocyanate component has a minimum average functionality of at least 2.8 and contains at least 70% by weight of a polyisocyanate adduct containing isocyanurate, uretdione, biuret, iminooxadiazine dione and/or allophanate groups.

15. The aqueous composition of claim 6 wherein the polyisocyanate component has a minimum average functionality of at least 2.8 and contains at least 70% by weight of a polyisocyanate adduct containing isocyanurate, uretdione, biuret, iminooxadiazine dione and/or allophanate groups.

16. The aqueous composition of claim 7 wherein the polyisocyanate component has a minimum average functionality of at least 2.8 and contains at least 70% by weight of a polyisocyanate adduct containing isocyanurate, uretdione, biuret, iminooxadiazine dione and/or allophanate groups.

17. The aqueous composition of claim 8 wherein the polyisocyanate component has a minimum average functionality of at least 2.8 and contains at least 70% by weight of a polyisocyanate adduct containing isocyanurate, uretdione, biuret, iminooxadiazine dione and/or allophanate groups.

18. The aqueous composition of claim 9 wherein the polyisocyanate component has a minimum average functionality of at least 2.8 and contains at least 70% by weight of a polyisocyanate adduct containing isocyanurate, uretdione, biuret, iminooxadiazine dione and/or allophanate groups.

19. A coating, sealant or adhesive prepared from the aqueous composition of claim 1.

* * * * *